Figure 1:
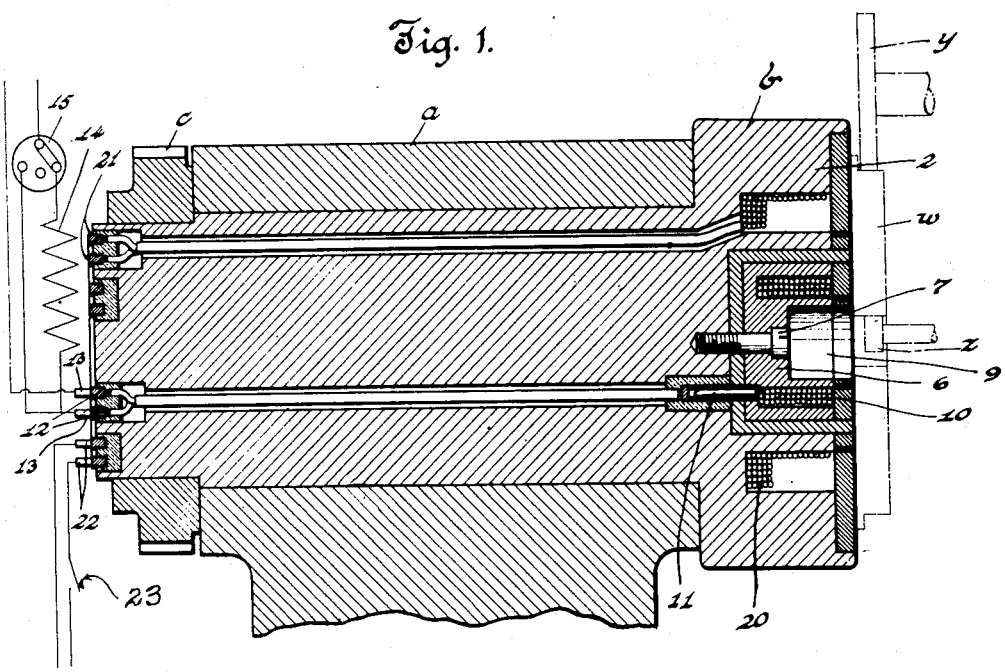

Jan. 20, 1925.  
B. M. W. HANSON  
1,523,771  
MAGNETIC CHUCK  
Original Filed March 31, 1921

Inventor  
Bengt M. W. Hanson  
By T. Clay Lindsey.  
His. Attorney

Patented Jan. 20, 1925.

1,523,771

UNITED STATES PATENT OFFICE.

BENGT M. W. HANSON, OF HARTFORD, CONNECTICUT.

MAGNETIC CHUCK.

Original application filed March 31, 1921, Serial No. 457,338. Divided and this application filed April 27, 1922. Serial No. 556,824.

*To all whom it may concern:*

Be it known that I, BENGT M. W. HANSON, a citizen of the United States, and resident of Hartford, county of Hartford, State of Connecticut, have invented certain new and useful Improvements in a Magnetic Chuck, of which the following is a specification.

The object of the present invention is to produce a magnetic chuck having various features of novelty and advantage. It is especially designed to provide a chuck, the active face of which shall be made up of a plurality of sections, each of which may be separately magnetized and the magnetic effects separately controlled. The embodiment of the invention selected for illustration and description is of a rotary spindle with parts constituting the magnetic chuck built directly into the end of the spindle, and the disclosure of the invention will be based upon this embodiment. It is to be understood, however, that the present disclosure is by way of exemplification only, it being evident that the invention as set forth in the appended claims is susceptible of use in various other arrangements, adaptations and is capable of modification and changes.

Figure 2:
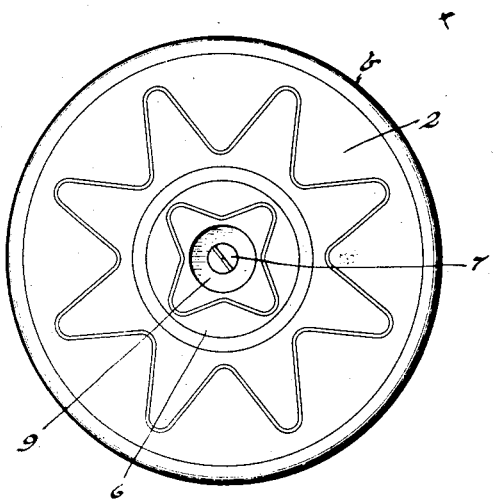

In the drawing:

Fig. 1 is a central vertical section of a chuck made in accordance with my invention, and Fig. 2 is a front end view thereof.

Referring to the drawing, $a$ is a bearing and $b$ is a chuck rotatably mounted therein and driven from some suitable source of power, as through the gear $c$. The end of the spindle constitutes a chuck face and, as here shown, is made up of two parts, an outer section 2, with a central recess within which is fitted a central chuck block 6, which constitutes the inner or central section of the chuck face. This block is removably positioned within the central recess and may be held in place as by means of the screw bolt 7.

10 designates a magnetizing coil fitting into the central chuck block and connected by the contact members 11 with the circuit wires leading to the contacts 12, 12 at the rear end of the spindle which are provided with brushes 13, 13 in the circuit of one of which a resistance 14 is located in order that the strength of the magnetic force in the chuck block 6 can be varied for purposes which will hereinafter be described. This circuit is controlled by a proper switch 15 in order that the current can be delivered to the coil 10 either directly or through the resistance 14. 20 designates a magnetizing coil in the outer section 2 of the chuck face and connected by circuit wires with contact rings 21, 21 and brushes 22, 22, equipped with a proper switch 23 for controlling the current supply to the coil 20.

It will be seen from this description that the chuck face comprises two sections insulated from one another; that each section may be separately magnetized, and that in one of the sections, as the central one here illustrated, the magnetic effect may be varied.

In operation, the piece of work, the size and configuration of which are immaterial, is positioned against the chuck face and a light current is thrown into the coil 10 of the central chuck block 6 to produce sufficient magnetism to hold the piece in place but permitting it to be shifted until it is precisely centered relative to the spindle. Then by further action of the switch 15 the resistance is cut out, delivering more current to the coil and consequently obtaining greater magnetic effect to hold the piece in position. After the work is thus positioned, the switch 23 is operated to throw the current into the coil 20 in the outer chuck section 2, producing a very heavy magnetic effect which operates over the large area of the work which lies against the end of the outer chuck section 2, thus securely holding the work against movement when the pressure of the tool is applied.

It will be seen from the foregoing that the work is directly held by the magnetic effect in the central magnetic chuck block 6, and at first is lightly held in order that it may be centered properly with relation to the spindle, after which the full current is turned into the coil 10 and into the coil 20, so that the work is held with security. It is, of course, evident that the chuck may or may not be provided with holding plates positioned against the chuck face of the outer section 2 so as to be held by the magnetic effect of this section, these holding plates being adjustable when the current is turned off so as to bring them into proper engagement with the work. Such an arrangement is shown and described in my pending application S. No. 457,338, filed March 31, 1921, of which the present application is a division. In the present instance, the piece of work $w$, illustrated in dotted lines, is shown as being in the form of a centrally apertured disc of such size as to overlie the faces of both of the chuck sections so as to be acted upon by the coils of each of these sections. In the drawings, I have shown for illustrative purposes a finishing tool, such as a grinding wheel $y$ operating on the periphery of the disc $w$, while a second grinding wheel $z$ is operating on the wheel of the central aperture in the work. It will be apparent that either of these operations can be carried on separately or both of them may be performed simultaneously at one and the same setting of the work, thus insuring concentricity of the surfaces operated upon. The central chuck block is recessed as at 9, so that the tool $z$ may be run through the opening in the work without being brought into contact with the chuck block. A number of chuck blocks 6, having different sized recesses, may be provided so that, as the bores in the various pieces of work vary from one another, recesses of different sizes can be provided.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. In a device of the character described, a chuck face comprising a plurality of sections insulated from one another and separate means for separately and independently magnetizing said sections.

2. In a device of the character described, a chuck face comprising a plurality of sections, means for separately and independently magnetizing said sections and means for varying the intensity of the magnetic effect in one of said sections.

3. A rotary magnetic chuck comprising a rotary spindle having a chuck face made up of two sections, one positioned within and magnetically insulated from the other, a magnetizing coil associated with each section, independent means associated with each coil for controlling a flow of current therethrough, and means associated with the said coil of the inner section for varying the intensity of the magnetic effects therein.

4. In a chuck, a magnetic section adapted to directly hold a piece of work by the magnetic effects within said section, means for varying the magnetic effects within said section, and means spaced from said section and co-operating therewith for holding the work in position.

5. A rotary chuck having a centrally located section, means for magnetizing the same, means for varying the intensity of the magnetic effects within said section, and means surrounding said section and cooperating with the work to hold the same in adjusted position.

6. A rotary magnetic chuck comprising a pair of sections one within the other and means for independently and separately magnetizing said sections.

7. A rotary magnetic chuck comprising a pair of sections one within the other, means for separately and independently magnetizing said sections, and means for varying the intensity of the magnetic effect in the inner one of said sections.

BENGT M. W. HANSON.